(12) United States Patent  
Pargny et al.

(10) Patent No.: US 11,506,143 B2  
(45) Date of Patent: Nov. 22, 2022

(54) FLOW MIXER WITH A CHANGING THICKNESS

(71) Applicant: SAFRAN AIRCRAFT ENGINES, Paris (FR)

(72) Inventors: Remy Olivier Pargny, Moissy-Cramayel (FR); Alain Paul Madec, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 803 days.

(21) Appl. No.: 16/477,063

(22) PCT Filed: Jan. 11, 2018

(86) PCT No.: PCT/FR2018/050064  
§ 371 (c)(1),  
(2) Date: Jul. 10, 2019

(87) PCT Pub. No.: WO2018/130787  
PCT Pub. Date: Jul. 19, 2018

(65) Prior Publication Data  
US 2019/0338725 A1    Nov. 7, 2019

(30) Foreign Application Priority Data  
Jan. 11, 2017 (FR) ...................................... 1750234

(51) Int. Cl.  
*F02K 1/48* (2006.01)  
*F02K 1/38* (2006.01)

(52) U.S. Cl.  
CPC .................. *F02K 1/48* (2013.01); *F02K 1/38* (2013.01); *F05D 2250/73* (2013.01); *F05D 2260/96* (2013.01)

(58) Field of Classification Search  
CPC ... F02K 1/38; F02K 1/386; F02K 1/40; F02K 1/48  
See application file for complete search history.

(56) References Cited

U.S. PATENT DOCUMENTS

| 5,265,807 A | 11/1993 | Steckbeck et al. | |
| 2008/0272228 A1* | 11/2008 | Mengle | F02K 1/386 244/54 |
| 2010/0257865 A1* | 10/2010 | Mengle | B64D 33/04 60/770 |

FOREIGN PATENT DOCUMENTS

| EP | 1496238 A1 * | 1/2005 | ............... F02K 1/34 |
| EP | 1496238 A1 | 1/2005 | |

(Continued)

OTHER PUBLICATIONS

International Preliminary Reporton Patentability received for PCT Patent Application No. PCT/FR2018/050064, dated Jul. 25, 2019, 12 pages (6 pages of English Translation and 6 pages of Original Document).

(Continued)

*Primary Examiner* — Arun Goyal  
(74) *Attorney, Agent, or Firm* — Womble Bond Dickinson (US) LLP (57) ABSTRACT

The invention relates to a concentric gas flow mixer in a multiple-flow turbomachine, comprising a nominally cylindrical upstream part and a downstream part having outer and inner lobes distributed peripherally around the tower of said mixer, characterised in that it comprises at least one modified lobe having a wall thickness, in at least one area, which is different from the other lobes, so as to modify the vibratory response of said mixer.

8 Claims, 8 Drawing Sheets

(56) References Cited

FOREIGN PATENT DOCUMENTS

| FR | 2875854 A1 | 3/2006 | | |
|---|---|---|---|---|
| FR | 2912469 A1 | 8/2008 | | |
| FR | 3008740 A1 | 1/2015 | | |
| FR | 3095675 A1 * | 11/2020 | ............. | F02K 1/386 |

OTHER PUBLICATIONS

International Search Report and Written Opinion received for PCT Patent Application No. PCT/FR2018/050064, dated May 4, 2018, 16 pages (7 pages of English Translation and 9 pages of Original Document).

Preliminary Research Report received for French Application No. 1750234, dated Aug. 30, 2017, 3 pages (1 page of French Translation Cover Sheet and 2 pages of original document).

* cited by examiner

FLOW MIXER WITH A CHANGING THICKNESS

GENERAL TECHNICAL FIELD AND PRIOR ART

The invention relates to a flow mixer for multi-flow turbojet engines.

In multi-flow, in particular dual-flow, turbojet engines, the mixing of the primary and secondary flows is carried out in the downstream portion of the turbojet engine. It is recalled that the primary flow is the hot air flow passing through the combustion chamber. The secondary flow is, for its part, a cold air flow propelled by the fan. It flows concentrically around the hot air flow, between the casing containing the compression steps, the combustion chamber and the turbines and a cowling of the turbojet engine.

The mixing of the two flows has multiple advantages: a reduction of the gas ejection noise, a thrust increase and an overall efficiency of the turbojet engine.

An example of mixer is described in the patent FR2.875.854. Conventionally, such a mixer has on its periphery a series of corrugations. These corrugations form together a plurality of outer and inner lobes distributed circumferentially about the longitudinal axis of the mixer.

According to the type of turbojet engine on which the mixers are mounted, it is usual to modify different parameters of the geometry thereof (length and diameter of the mixer, radius of curvature of the lobes, etc.) in order to optimize the aerodynamic performances and the mixing of the flows.

These modifications have consequences for the dynamic behavior of the mixers.

For example, the extension of the length of the mixer and the increase of the radius of curvature of its lobes can lead to a decrease in rigidity of the part, lowering the frequencies of its natural modes of vibration.

When these modes of vibration match with some stabilized operating speeds of the turbojet engine, the deformations generated by the vibratory response of the mixer may be dangerous for its structure and its mechanical strength.

This is illustrated in FIGS. 1a, 1b and 2a, 2b.

Figure 1A:
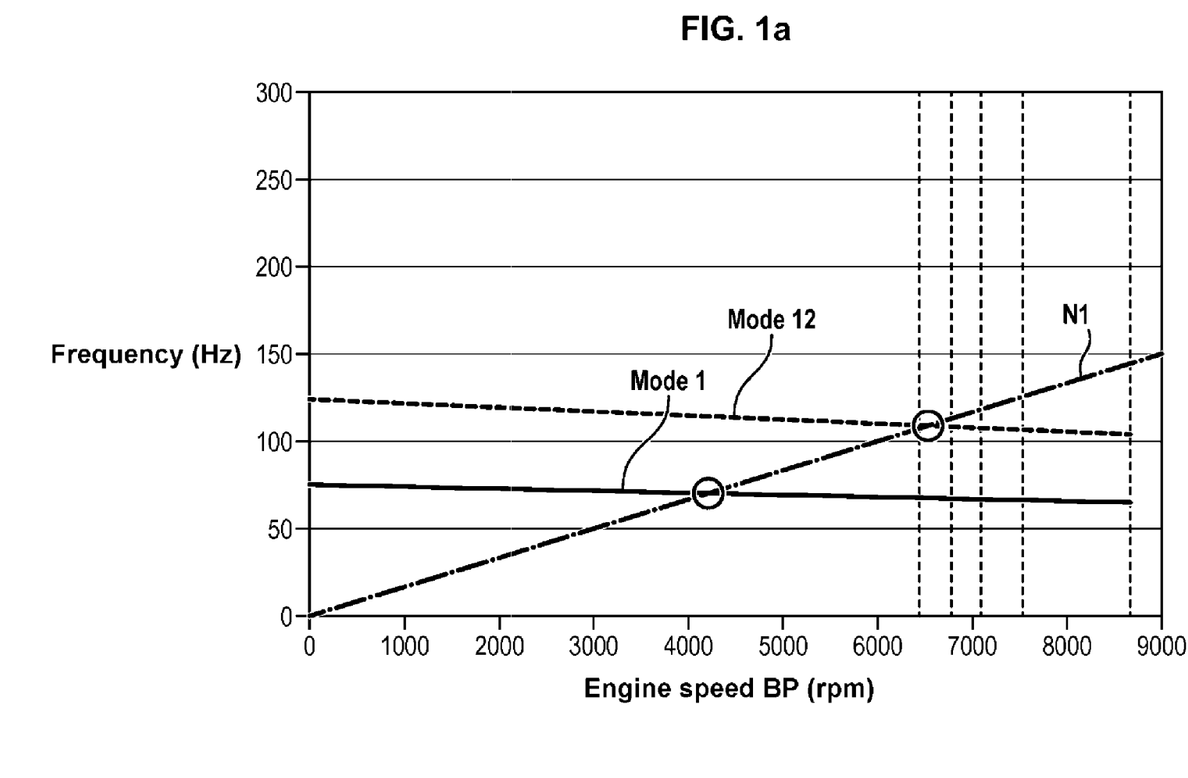

With reference to FIG. 1a, the study of the Campbell diagram, showing the change of the vibration frequencies generated in the mixer 1 as a function of the operating speed of the turbojet engine, highlighted the matching of two pure diameter natural modes with the frequencies of vibrations generated by some operating speeds of the turboprop.

The two decreasing lines correspond to the natural frequencies of two pure diameter vibration modes of type 0Φ.

This type of vibratory mode causes a radial and tangential deformation of the part, located on some areas of the mixer.

Figure 1B:
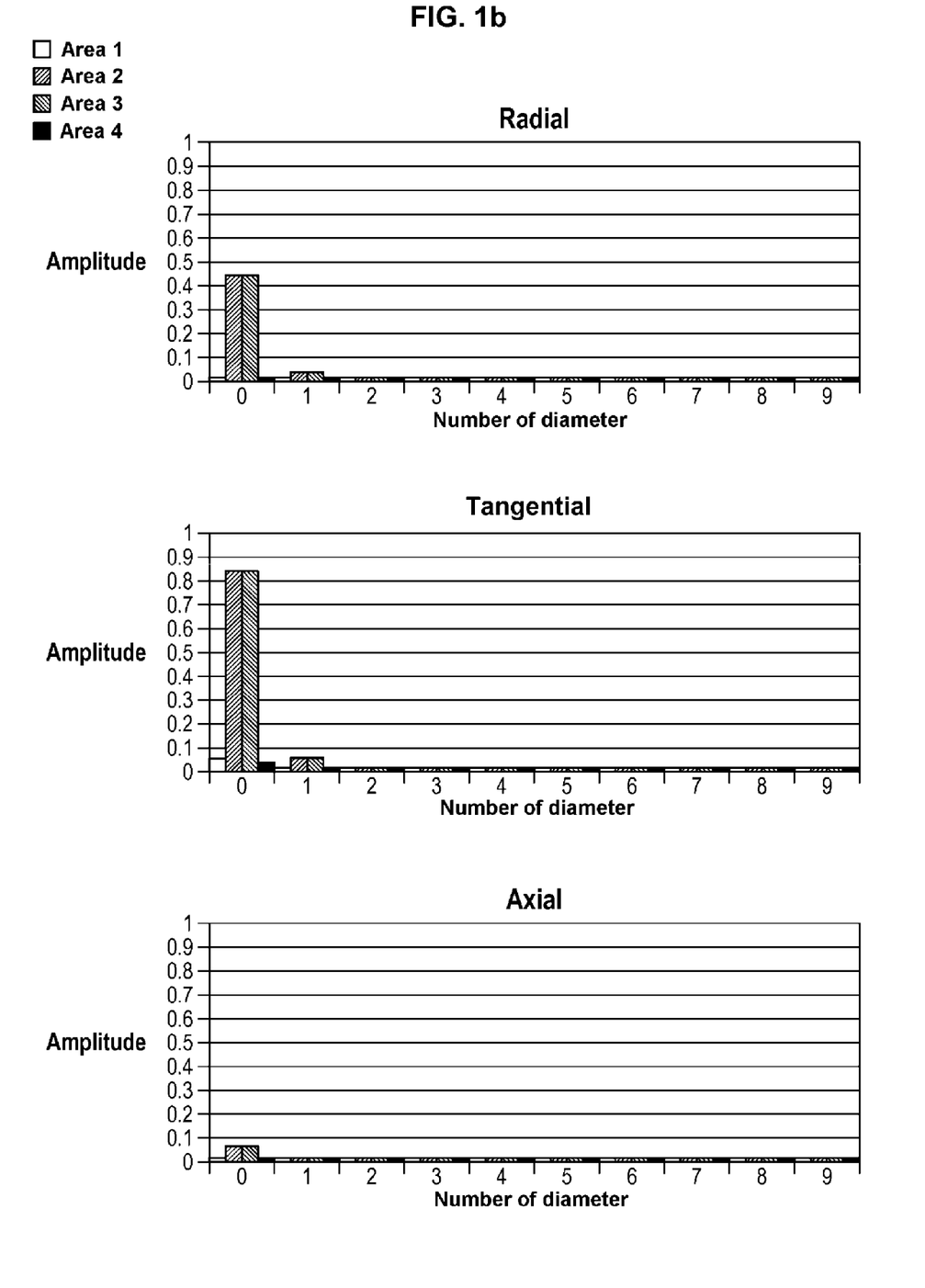

The distribution of the deformations symbolized in FIG. 1b shows that the vast majority of the deformations are located on the column 0, this distribution characterizing a pure mode of type 0Φ.

This type of deformation successively causes circular-shaped expansions and contractions of the part.

The frequency of the vibrations of the mixer generated by the operation of the turbojet engine, matches with the two pure diameter natural modes, in particular with the mode 12 at a frequency corresponding to one of the stabilized operating modes of the turbojet engine, symbolized by the vertical lines.

Figure 2A:
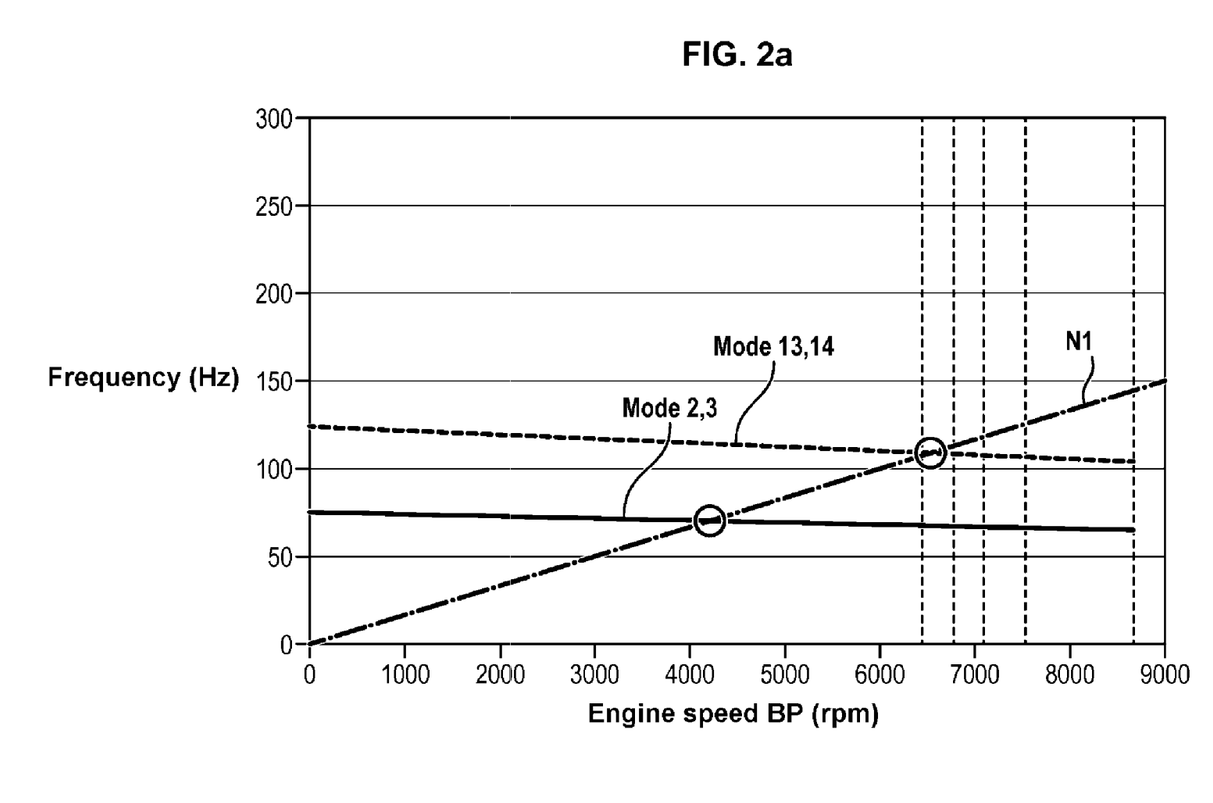

With reference to FIG. 2a, the study of the Campbell diagram of the mixer 1 highlights the matching of the frequency of the vibrations generated in the mixer 1 by the operation of the turbojet engine with two pure diameter modes of type 1Φ.

Figure 2B:
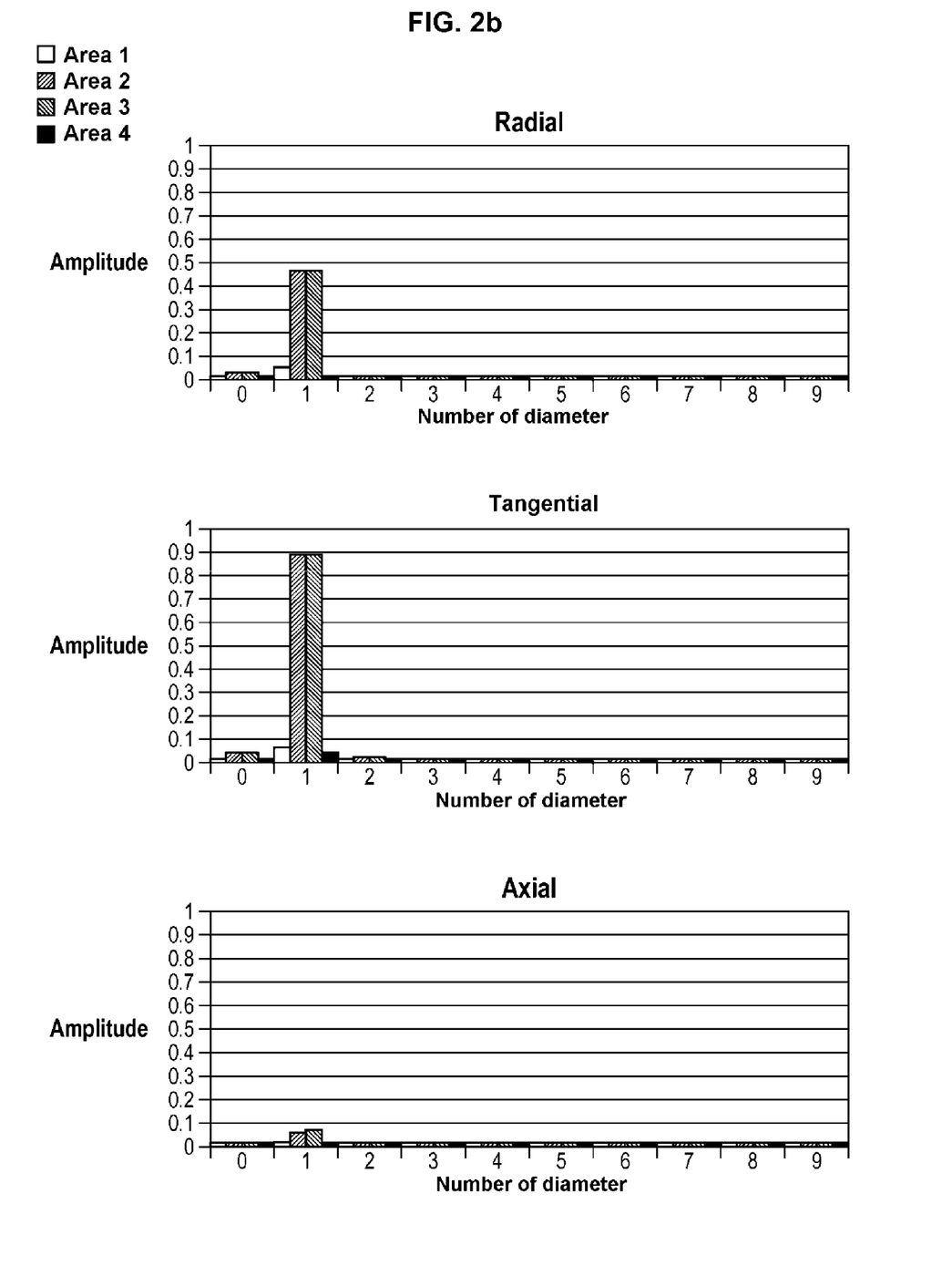

This type of vibratory response causes a radial and tangential deformation of the part, the distribution of which is represented in FIG. 2b, successively causing elliptically-shaped expansions and contractions. All the deformations are localized on the column 1, this distribution characterizing a pure mode of type 1Φ.

One of these pure diameter modes is achieved for a frequency corresponding to a stabilized operating speed of the aircraft.

GENERAL PRESENTATION OF THE INVENTION

A general object of the invention is to minimize the vibratory response of the mixer.

Another object is to limit the gain in mass of the mixer inherent in the modifications of its structure.

According to one aspect, the invention proposes a mixer for concentric gas flows in a multi-flow turbomachine, including a nominally cylindrical upstream portion and a downstream portion having outer and inner lobes distributed circumferentially over the perimeter of said mixer, characterized in that it includes at least one modified lobe disposed in an aperiodic angular pattern and having, at least at one area, a wall thickness different from that of the other lobes, so as to modify the vibratory response of said mixer.

Such a mixer is advantageously completed by the following different characteristics taken alone or in combination:
  the modified lobes have a wall thickness that varies between 110% and 300% of the wall thickness of the regular lobes;
  the modified lobes have a thickness of 1.5 mm;
  the modified lobes have a wall thickness that varies between 50% and 90% of the wall thickness of the regular lobes; of course, if the mixer also includes at least one modified lobe having a wall thickness that varies between 110% and 300% of the wall thickness of the regular lobes, this lobe is different from that or those having a wall thickness between 50% and 90% of the wall thickness of the regular lobes;
  the mixer includes at least two modified lobes;
  an addition or removal of material extends over an entire area including an inner half-lobe, an outer lobe and an inner half-lobe;
  the modified lobes have a configuration of wall thicknesses designed to generate complex vibration modes;
  two lobes disposed in an aperiodic angular pattern have a different wall thickness.

According to another aspect, the invention relates to a turbomachine including such a mixer.

PRESENTATION OF THE FIGURES

Other characteristics and advantages of the invention will appear from the following description, which is purely illustrative and non-limiting, and should be read with reference to the appended figures in which:

FIG. 1a is a graphical representation of a Campbell diagram highlighting the matching of a pure diameter natural mode of the type 0Φ of the mixer with the vibrations caused by the turbojet engine during stabilized operating speeds, FIG. 1b being a histogram representation of the distribution of the deformations encountered in one of the natural modes highlighted in the Campbell diagram in FIG. 1a;

FIG. 2a is a graphical representation of a Campbell diagram highlighting the matching of a pure diameter natural mode of type 1Φ of the mixer with the vibrations caused by the turbojet engine during stabilized operating speeds, FIG. 2b being a histogram representation of the distribution of the deformations encountered in one of the natural modes highlighted in the Campbell diagram in FIG. 2a;

DESCRIPTION OF ONE OR SEVERAL MODES OF IMPLEMENTATION AND EMBODIMENTS

Overviews

Figure 3:
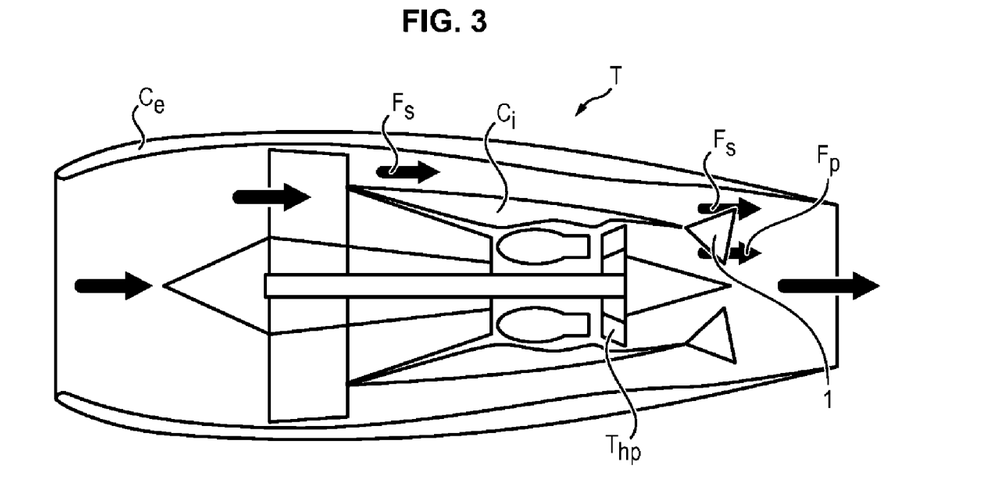
FIG. 3 represents a schematized sectional view of a turbojet engine seen in profile and the elements constituting it.

With reference to FIG. 3, a dual-flow turbojet engine T, whose general operation considered as known will not be explained, has conventionally from upstream to downstream, a fan propelling an air flow which will be divided into a primary flow Fp and a secondary flow Fs.

The primary flow flows in a low-pressure compressor, a high-pressure compressor, a combustion chamber, a high-pressure turbine Thp and joins the secondary flow Fs downstream of a mixer 1.

The secondary flow F flows, for its part, concentrically with the primary flow Fp around the inner casing Ci and inside the outer casing Ce.

The function of the mixer 1 is to optimize the mixing of the primary Fp and secondary Fs flows at the outlet of the turbojet engine T.

The mixing of the primary Fp and secondary Fs flows downstream of the turbojet engine T bringing many advantages both in terms of performances and environmental disturbances, new solutions are continuously explored to optimize the homogeneity of the mixture.

Flow Mixer

Figure 4A:
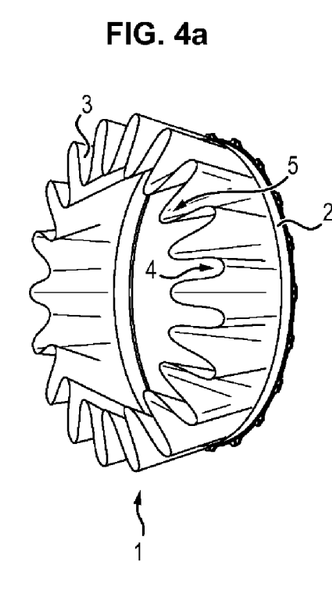
FIGS. 4a, 4b and 4c are 3D modeling of the flow mixer from different viewing angles.
Figure 4B:
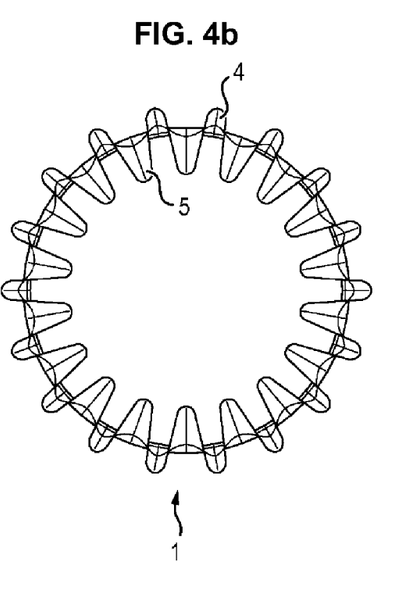
Figure 4C:
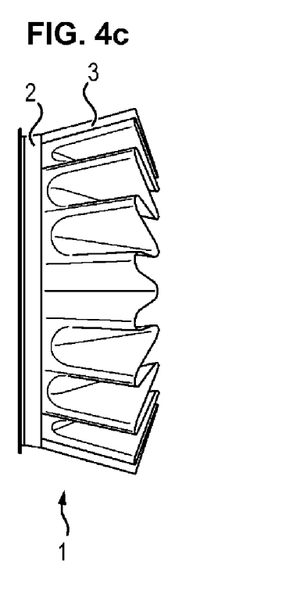

With reference to FIGS. 4a, 4b and 4c, a daisy wheel-type lobed mixer 1 has a nominally cylindrical upstream portion 2 and a corrugated downstream portion 3.

The indications concerning the radial, axial and tangential directions correspond to the axis of the mixer, which is also that of the turbojet engine. The upstream and downstream concepts follow the flow direction of gases in the turbojet engine.

The corrugations of the downstream portion form together a plurality of radially outer 4 and inner 5 lobes distributed circumferentially about the longitudinal axis of the mixer 1.

The mixer has the particularity that at least one of its lobes has in at least one area an addition or a withdrawal of material configured to modify the vibratory response of said mixer.

This addition or withdrawal is chosen to shift the frequencies of its natural modes in order to avoid a matching with the vibration frequencies generated by a stabilized operating speed of the turbojet engine.

In particular, in order to reduce the vibratory response, as illustrated later, the modifications made to the mixer 1 are intended to promote the appearance of complex modes composed of a sum of pure modes.

Embodiments of the Mixer

Figure 5A:
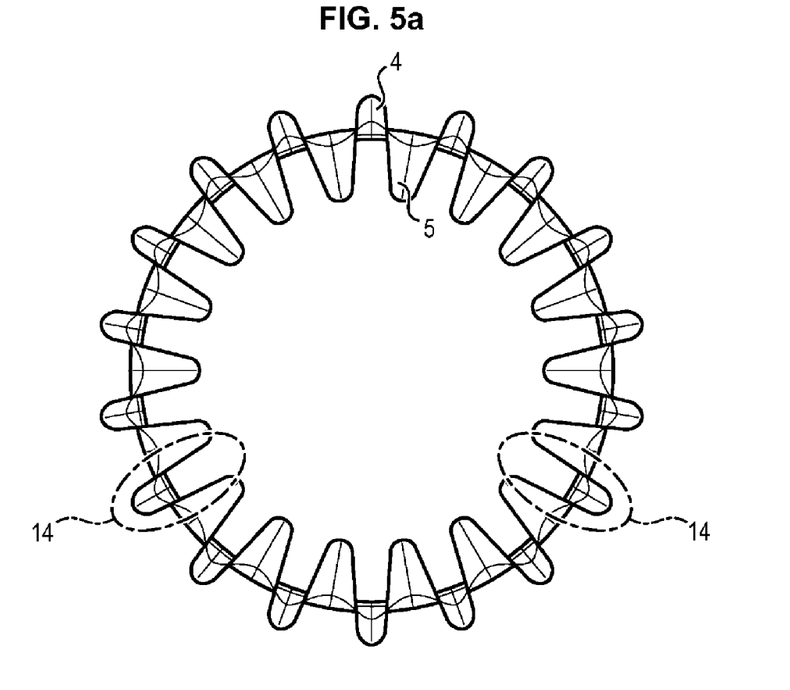
FIGS. 5a and 5b represent the localization and the type of the deformations on a modeling of the mixer for said 0Φ pure diameter mode.

With reference to FIG. 5a, a retained solution includes two lobes having a modified thickness 14. Indeed, in order to minimize the mass increase, the best compromise between mass increase and vibratory response modification is sought.

Figure 5B:
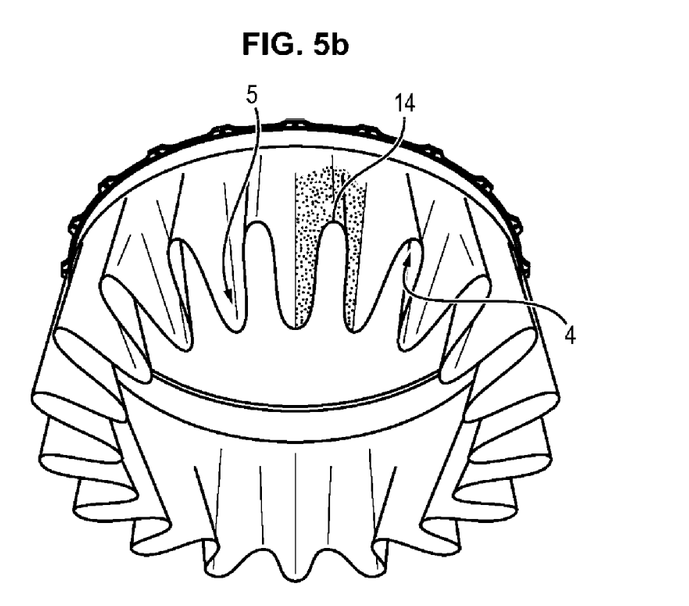

A modified lobe 14 is therefore an outer lobe 44 which has a thicker surface portion, this portion extending between the vertices of the two inner lobes 5 that border it as observable in FIG. 5b.

The two lobes 14 mentioned above have a wall thickness different from the other lobes 13. In a retained solution, the mixer 1 includes 16 regular lobes 13 with a wall thickness of 1 mm and 2 particular lobes 14 with a wall thickness of 1.5 mm.

The thickening rate of the retained wall also takes into account manufacturing constraints, in order to ensure that, on a finished product, a thick lobe 14 having a minimum thickness in its tolerance area is substantially different from a regular lobe 13 having a maximum thickness in its tolerance area to ensure a substantially constant gain in performances for all mixers 1.

The thickness of a modified lobe 14 can be 110% to 300% of the thickness of a regular lobe.

For example, a modified lobe 14 may have a thickness representing 150% of the thickness of a regular lobe 13.

A marked difference allows an obvious visual differentiation during manufacture, the mixer 1 being manufactured by assembling half-lobes juxtaposed and welded together.

During assembly, two different types of parts make it possible to produce the mixer 1:
   a first type being a regular lobe 13 including an outer lobe framed by two inner half-lobes, this type of part composing mostly the mixer;
   a second type being a modified lobe 14 having the same general geometry as a regular lobe except for the thickness of its wall, and in the case of the solution represented in FIG. 5a, two modified complete lobes are included in the mixer 1.

The parts are juxtaposed and welded to form the lobes of the mixer.

The contact profile between a modified lobe 14 and a conventional lobe 13 is not smoothed, and therefore includes a "step" at the contact, related to the difference in thickness between a modified lobe and a regular lobe.

Another method for manufacturing a mixer is described in document FR2912469.

In other embodiments of the invention, it is also envisaged to reduce the thickness of a lobe to generate the same effects, a modified lobe 14 having in this embodiment a thickness that can represent 25% to 90% of the thickness of a regular lobe.

A modified lobe 14 may for example have a thickness representing 50% of the thickness of a regular lobe 13.

An occasional modification of the thickness of one or several lobe(s) is also a possibility, such as an addition of material or a local extra-thickness, as well as a removal of material such as a bore or a groove made on one or several lobe(s).

The relative position of the modified lobes 14 also affects the vibratory response of the mixer 1. Indeed, the angular periodicity (periodicity along a rotation about the axis of the mixer) of the pattern formed by the position of the modified lobes 14 promotes the appearance of natural modes. One of the solutions envisaged is therefore, in the case of a thickening of several lobes, to arrange them so as to avoid creating a pattern forming an angular repetition.

With reference to FIG. 5b, the thickened area of a modified lobe 14 thus relates to an outer lobe 4.

The adopted configuration therefore makes it possible to promote the appearance of complex vibratory modes, less damaging to the mixer 1, in addition to drastically reducing the number of modes with diameters considered to be pure.

Desired Vibratory Mode

Figure 6A:
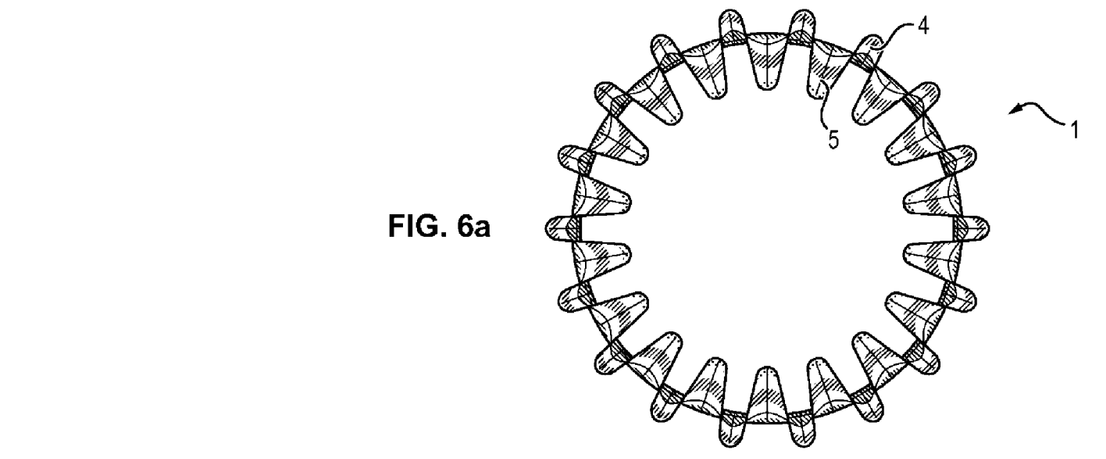
FIGS. 6a and 6b represent the amplitude and the location of the deformations of a complex vibration mode on a mixer.
Figure 6B:
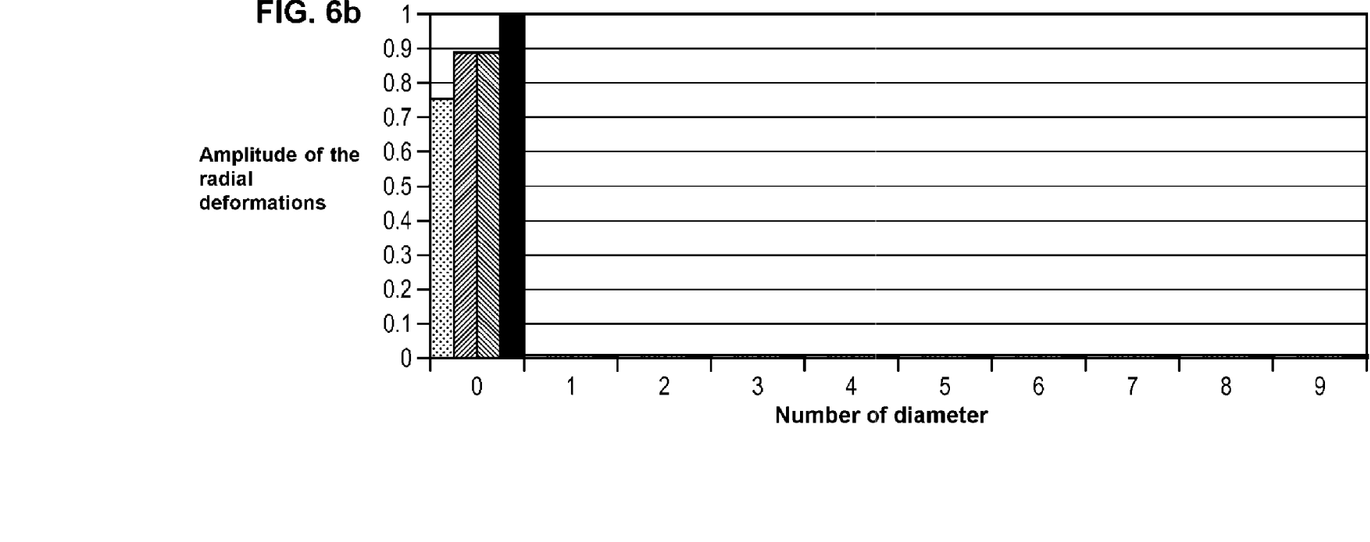

With reference to FIG. 6b, it is possible to observe the mapping of the deformations in a pure deformation mode, here a mode 0Φ. The deflected shape is generally uniform for a given radius, the largest deformation being achieved at the smallest diameter of the part, at the crest of the inner lobes 5.

Figures 7A, 7B:
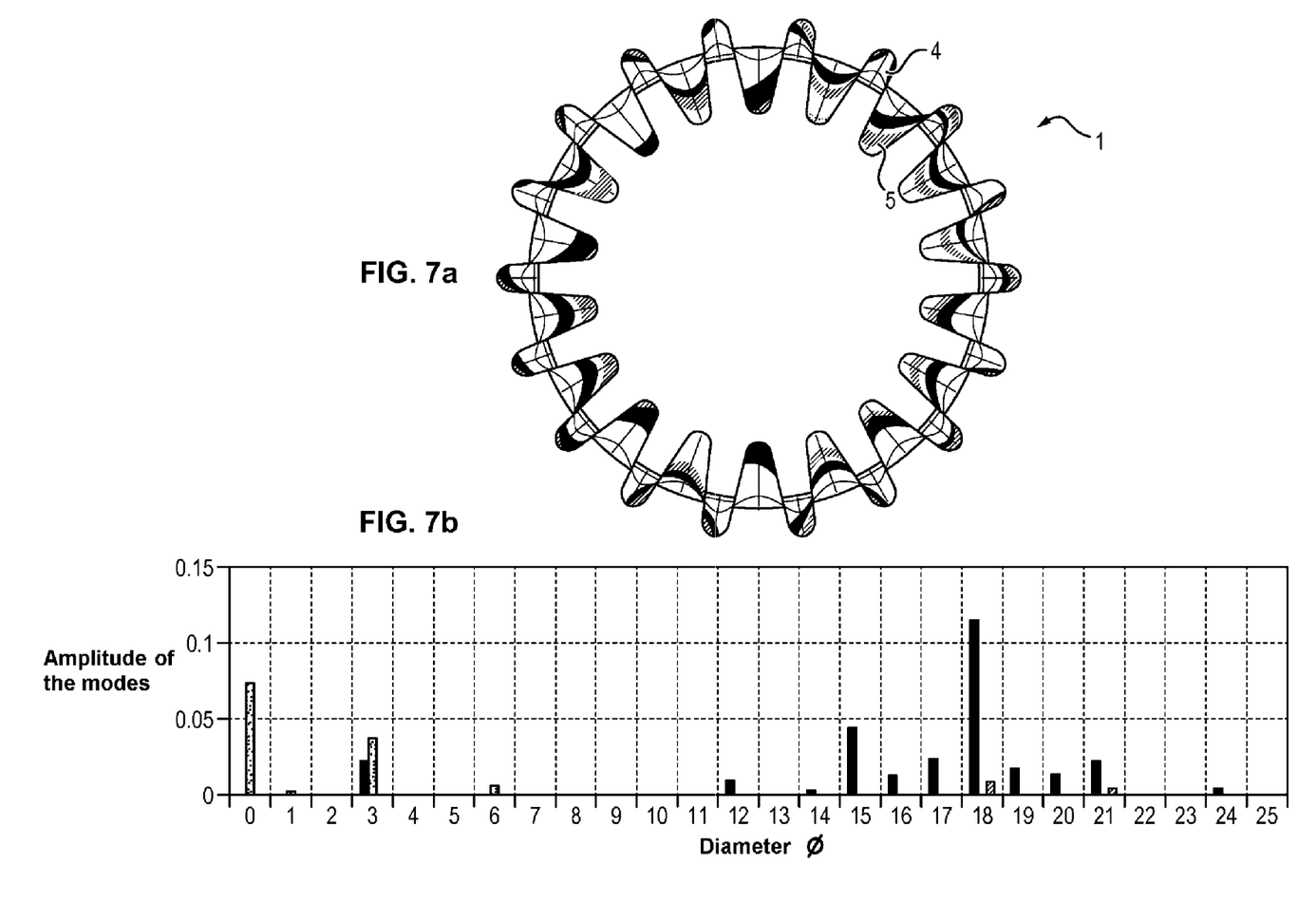
FIGS. 7a and 7b represent a 3D modeling of the mixer highlighting the modifications received in order to modify its vibratory response.

With reference to FIG. 7b, it can be noticed that the represented critical mode consists of a sum of modes with radial deformation at diameters Φ3, Φ12, Φ14, Φ15, Φ16, Φ17, Φ18, Φ19, Φ20 and Φ21, modes with tangential deformation at diameters Φ0, Φ3 and Φ6, and modes with axial deformation at diameters Φ18 and Φ21. The distribution of the deformations is less uniform, in addition to having smaller amplitude.

The invention claimed is:

1. A mixer for concentric gas flows in a multi-flow turbomachine, including a nominally cylindrical upstream portion and a downstream portion having outer lobes and inner lobes distributed circumferentially over the perimeter of said mixer, characterized in that it includes at least one modified lobe disposed in an aperiodic angular pattern and having, at least at one area, a wall thickness of a material of the at least one area different from other of the outer lobes or the inner lobes, so as to modify the vibratory response of said mixer.

2. The mixer as defined in claim 1, characterized in that the at least one of the modified lobe has the wall thickness that varies between 110% and 300% of a wall thickness of the other of the outer lobes or the inner lobes.

3. The mixer as defined in claim 1, characterized in that the at least one of the modified lobe has the wall thickness of 1.5 mm.

4. The mixer as defined in claim 1, characterized in that the at least one of the modified lobe has the wall thickness that varies between 50% and 90% of the a wall thickness of the other of the outer lobes or the inner lobes.

5. The mixer as defined in claim 1, characterized in that the at least one modified lobe includes at least two modified lobes.

6. The mixer as defined in claim 1, characterized in that an addition or removal of material extends over an entire area including a first inner half lobe, the outer lobe and a second inner half-lobe.

7. The mixer as defined in claim 1, characterized in that two of the at least one modified lobe disposed in an aperiodic angular pattern have a different wall thickness.

8. A turbomachine including the mixer as defined in claim 1.

* * * * *